Patented July 24, 1951

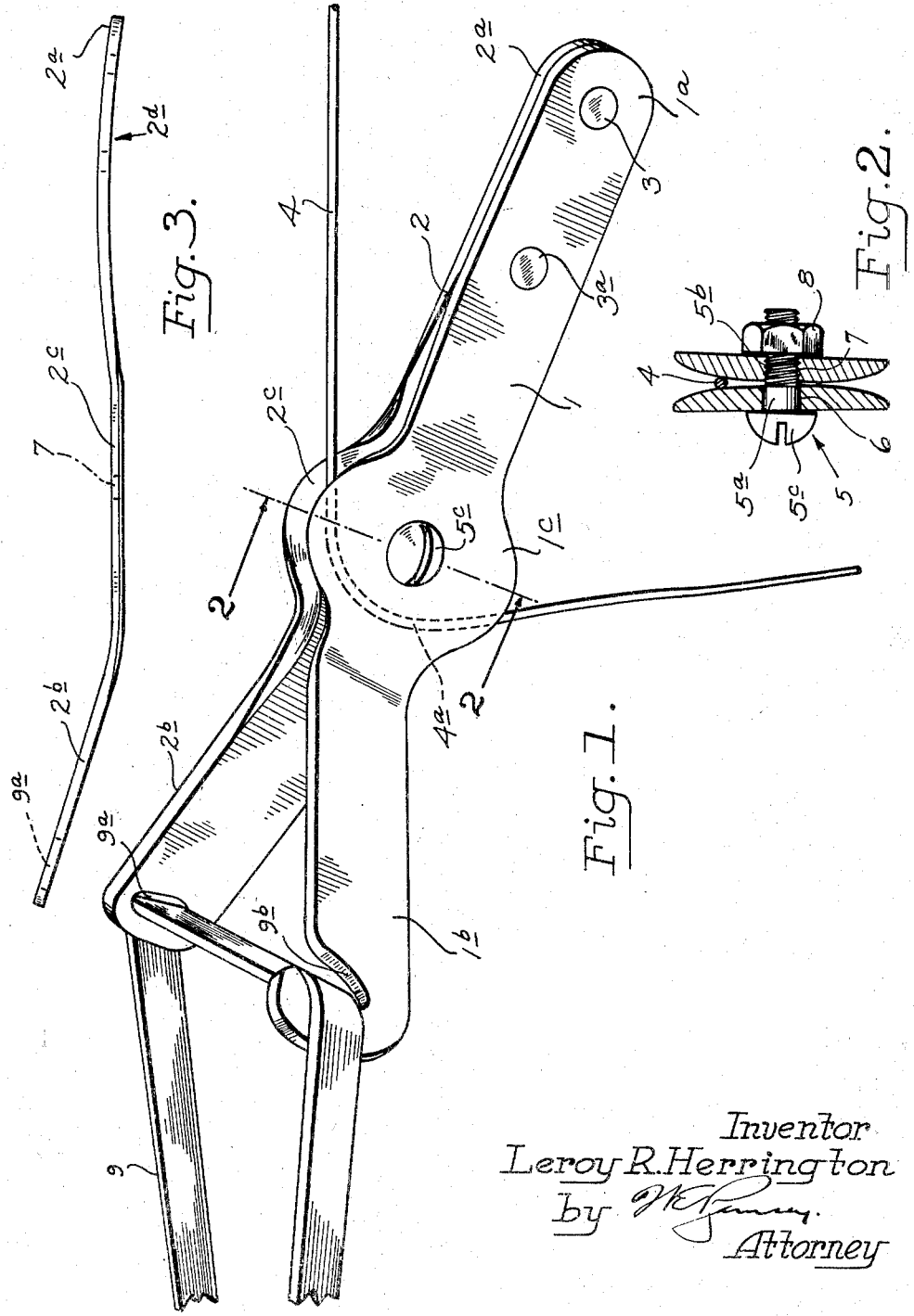

2,561,572

UNITED STATES PATENT OFFICE 2,561,572

LINE HOLDER

Leroy R. Herrington, Astoria, Oreg.

Application December 8, 1947, Serial No. 790,274

1 Claim. (Cl. 24—115)

My invention relates to fastening devices for fishing and particularly for trollers which have fishing lines suspended from booms. Said fishing lines normally are heavily weighted so that they will be held at a predetermined depth in the water independently of the boat's cruising speed. Said fishing lines thus must be securely supported at the end of the boom, and must lead inwardly to the boat so that some type of mechanical pulling device may be used for pulling in and playing out said fishing lines. The devices which perform this function are known in the fishing art as line clamps or "clothes pins."

The object of my invention is to provide a line clamp of this character which will hold a fishing line securely without kinking, cutting, or otherwise abrading it so that it will be weakened.

A further and more specific object of my invention is to provide a device of this character which is of simple, sturdy form, which is adjustable to accommodate a relatively wide range of line sizes, and one which will not easily become bent or deformed and thus be rendered inoperative.

A further object of my invention is to provide a fishing line clamp which is preformed to exercise a grip upon a line independently of any adjustment or external pressure applying devices, but which may be varied in size by an adjusting screw to hold and accommodate lines of greater minimum diameter.

Further and more specific features of my invention and the mode of operation thereof are hereinafter described with reference to the accompanying drawings, in which:

Fig. 1 is a perspective view of a fishing line clamp embodying my invention, showing a section of trolling line engaged thereby;

Fig. 2 is a transverse section through said clamp taken on the line 2—2 in Fig. 1, illustrating the manner in which a trolling line is held by said clamp and the means by which said clamp may be adjusted to accommodate several different sizes of trolling line; and Fig. 3 is an edge view of one of the two members comprising a fishing line clamp, illustrating the manner in which said members are preformed.

A line clamping device embodying my invention comprises a pair of flat, elongated, elastic allochiral members 1 and 2, which are fastened flatwise together at one end 1a—2a, respectively, by a pair of rivets 3—3a or similar fastening devices. At the opposite ends 1b—2b thereof, said members flare outwardly, diverging at substantial but complementary angles. Thus, the ends 1a—2a define the stem portion and the ends 1b—2b the leg portions of a Y-shape. Adjacent the middle of each of said members are bosses 1c—2c. These are arranged substantially at the center of said members and are located adjacent the point where said ends 1b—2b commence to diverge. Said bosses are preferably of circular form and are substantially larger in diameter than the width of the remainder of said members. Said bosses lie in face-to-face abutment with each other and between them clip a trolling line 4.

The members, being elastic, could become spaced apart a substantial distance because the rivets are arranged only at one end. To limit the physical spacing of the opposed faces of said bosses, I pass a screw-threaded bolt centrally through said bosses. The center of the boss 1c is provided with a bore 6, which defines a journaled fit for the shank 5a of the bolt 5. The hole 7 through the center of the boss 2c is tapped and is in threaded engagement with the threaded portion 5b of the shank of the bolt 5. Said bolt preferably has a milled or slotted head 5c so that it may be turned quite easily, and as it is turned, the threads thereon either move said head inwardly or outwardly, depending upon the direction in which said bolt is turned. A nut 8 is also threaded on the threaded portion 5b of the bolt and lies exteriorly of the member 2. Said nut serves as a lock-nut for holding the bolt 5 in set position.

As is shown in Fig. 3, the member 2 is inwardly bowed at 2d, which is the portion extending from the end 1a to the boss 1c. The member 1 is similarly but reversely bowed. Thus when the rivets 3—3a are seated in position, the portions are deformed to eliminate said bowing and, because of the elasticity of said members, said deformation causes the bosses to be held face-to-face, exerting substantial pressure. The opposed faces of said bosses are formed more or less upon a flowing circular contour, as is shown in Fig. 2, and thus the marginal edges of said bosses are spaced farther apart than the central portions thereof. That is to say, the opposed faces of said bosses flare outwardly and provide an annular space between said bosses to accommodate the entry of the trolling line 4 and the pinching or binding thereof as it moves towards the center of said bosses. Thus, if the bolt 5 is adjusted so that the spacing of said bosses immediately adjacent said bolt is less than the diameter of the trolling wire 4, it will tend to move down into said annular space until it is in secure abutment with the opposed faces of said bosses.

In practice, said trolling line is formed into a bight 4a, as is shown in Fig. 1, and because of the circular form of said bosses, the bight is bent about a flowing contour of substantial radius. Thus there are not formed in said trolling line sudden bends or nicks which would decrease the tensile strength thereof, or tend to produce a weakened section which might produce fracture at said point.

The binding of said bosses against the opposite sides of the trolling line is augmented by the action of a looped securing thong 9, which joins the ends 1b—2b of the members together. That is, said thong passes through an aperture 9a in the member 2 and is engaged by a hook-like end 9b on the member 1. The thong is secured to some stationary part of a boom or similar device (not shown) so as to support the line gripping device and hold it extending laterally of a boat, so that it may function as desired. When said line is subjected to tension, as when trolling with a heavy weight or in resisting the pulling of a fish, said tension in the line produces two results: It tends to set the bight 4a tightly in the annular space between the bosses 1a—1b. It also causes the thong to pull the divergent ends 1b—2b together to augment the frictional and wedging engagement upon said line of the opposed faces of the bosses. When the boom is swung inboard, the trolling line may be disengaged from the gripping device merely by straightening it out and pulling the line in by hand or some auxiliary mechanical device. To permit mechanical devices to be used, it is desirable that the line may be freed completely of the gripping device. This is the reason for providing the hook-shaped end 9b. The thong may be slipped out of said hook-shaped end and be disengaged therefrom, and the line, when straightened, may pass up between said ends 1b—2b and easily be freed from the gripping device.

Although I have illustrated the bosses as having curved opposed faces formed upon relatively broad sweeps, I do not wish to be limited to this specific formation. It may be necessary only to flare the outer edges. This is particularly true if the central portions of said bosses are maintained to a minimum setting less than the diameter of the smallest line used. Another consideration might be that said bosses should diverge equally from a median plane extending normal to the bolt 5 and slope outwardly therefrom, possibly progressively towards the periphery of said bosses.

I claim:

A line gripping device comprising a pair of flat, elongated, elastic allochiral members fixed flatwise together adjacent one end and diverging at substantial oblique complementary angles at the other end, an enlarged circular boss formed on each of said members intermediate the ends thereof and at a point where the last mentioned end diverges, said bosses having a face-to-face, line gripping relation with each other, the opposed faces of said bosses being of curvilinear section and having flared edges around which a line may be looped to extend in a direction opposed to said diverging ends, a fastening device extending through said members adjustable to vary the physical spacing of said bosses from each other, the diverging ends of said members carrying grip-receiving means for inserting a fastening device to press said ends together and anchor the line-gripping device.

LEROY R. HERRINGTON.

REFERENCES CITED

The following references are of record in the file of this patent:

UNITED STATES PATENTS

| Number | Name | Date |
|---|---|---|
| 171,801 | Harvey | Jan. 4, 1876 |
| 426,731 | Metzler | Apr. 29, 1890 |
| 540,361 | Meckel | June 4, 1895 |
| 731,352 | Field | June 16, 1903 |
| 974,667 | Ingalls | Nov. 1, 1910 |
| 1,044,302 | Underhill | Nov. 12, 1912 |
| 1,284,918 | Miller | Nov. 12, 1918 |
| 1,653,747 | Usher | Dec. 27, 1928 |
| 2,163,695 | Campbell | July 11, 1939 |
| 2,460,916 | Baumeier | Feb. 8, 1949 |

FOREIGN PATENTS

| Number | Country | Date |
|---|---|---|
| 3,645 of 1891 | Great Britain | Feb. 28, 1891 |